No. 707,150. Patented Aug. 19, 1902.

W. S. MOODY.
SYSTEM OF ELECTRICAL DISTRIBUTION.
(Application filed June 6, 1902.)

(No Model.)

WITNESSES:
Harry H. Pilden
Helen Orford

INVENTOR:
Walter S. Moody.
by Albert G. Davis
Att'y.

UNITED STATES PATENT OFFICE.

WALTER S. MOODY, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 707,150, dated August 19, 1902.

Application filed June 6, 1902. Serial No. 110,416. (No model.)

*To all whom it may concern:*

Be it known that I, WALTER S. MOODY, a citizen of the United States, residing at Schenectady, county of Schenectady, State of New York, have invented certain new and useful Improvements in Systems of Electrical Distribution, (Case No. 2,481,) of which the following is a specification.

Alternating-current systems of that type in which a constant alternating current is used, for example, for supplying a circuit of arc-lamps and is derived from a constant-potential source of energy through the use of constant-current reactive coils are apt to be injuriously affected through the occurrence of grounds upon the system. The constant-current reactive coil used in such a system is ordinarily connected in series with one of the leads extending from the constant-potential supply-mains. If under these circumstances grounds should exist simultaneously in the system, one in a portion of the circuit on one side of the reactive coil and another on the system at a point on the other side of the reactive coil, the effect would be substantially a short circuit about the reactive coil, thereby bringing the full potential of the constant-potential mains upon the lamp-circuit, and if the number of lamps in use should happen to be small the resulting flow of current would be so great as to destroy the lamps and do other damage. I have found that this objection may be to a large extent remedied by causing current from the constant-potential mains to pass first through a portion of the winding of the reactive coil, then through the lamp-circuit, and then through the remaining portion of the winding of the reactive coil to the other constant-potential main. By this arrangement the occurrence of grounds on one side, so to speak, of the constant-current system would not disable the system, because there would then remain a portion of the reactive coil, which would serve to prevent a destructive current from flowing.

My invention comprises, in addition to the broad idea embodied in the arrangement above described, certain amplifications and modifications, all of which are set forth in detail in the following description, which is to be taken in connection with the accompanying drawings, in which—

Figure 1:
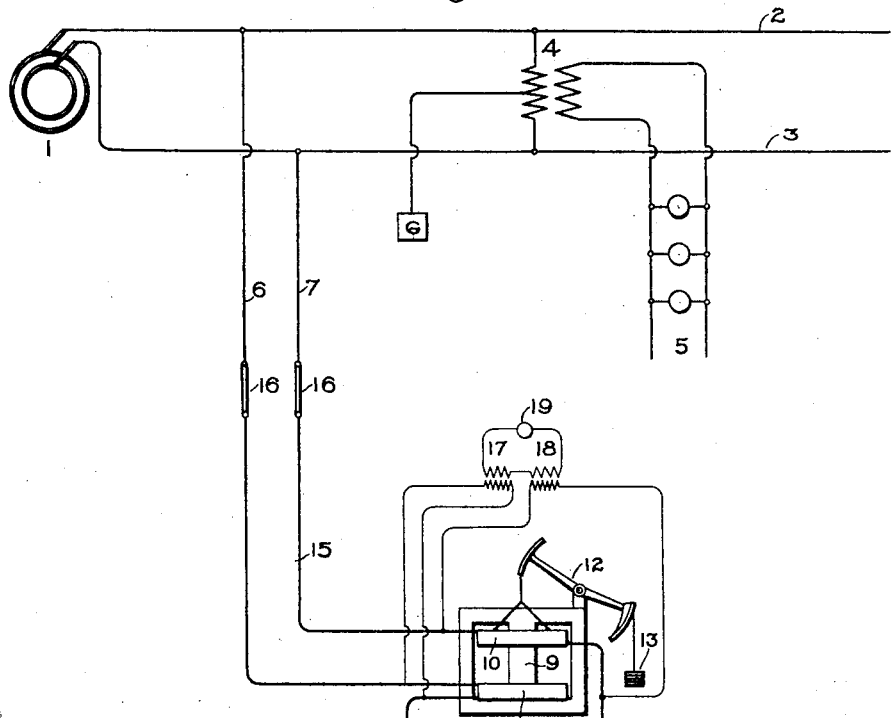
Figure 3:
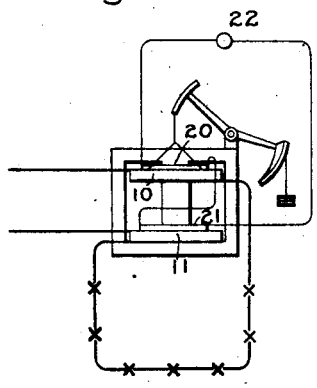
Figure 2:
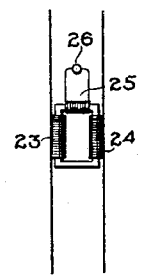

Figure 1 represents a system embodying my invention, and Figs. 2 and 3 certain modified details.

In carrying out my invention in practice the source of constant-potential current may be either single phase or muliphase, as desired; but for purposes of simplicity in illustration I have represented the system in Fig. 1 as a single-phase system. The source of single-phase current is indicated conventionally at 1, and from this source extend mains 2 and 3, which supply current for any desired purpose. Thus at 4 is indicated a transformer having its primary connected across the supply-mains and its secondary to a bank of lamps or other translating devices 5. It will be evident, however, that any other suitable current-consuming devices may be used in connection with the supply system.

From the constant-potential mains 2 and 3 extend leads 6 and 7, by which current is delivered to a series circuit of arc-lights, (indicated at 8.) In order that the current in this circuit may be rendered constant, I connect in series with the circuit a reactive coil, commonly called a "constant-current reactive coil," for consuming the excess voltage over and above what is required to maintain a constant current in the lamp-circuit. This reactive coil is of the well-known construction, having a magnetic core 9, provided with two relatively movable coils 10 and 11. One of the coils—as, for instance, the lower one, 11—may be fixed, while the upper one, 10, is movable and has its weight partially counterbalanced by means of the pivoted lever 12, carrying at its outer end the counterweights 13, the number of which may be varied as desired.

In connecting up the reactive coil one of the coils 10 is connected in one of the leads extending from the constant-potential system and the other coil 11 in the other lead extending from the constant-potential system, the arc-light circuit 8 being connected between the coils 10 and 11, as indicated. In case grounds should occur on the system—as, for example, at the points 14 and 15—it will be evident that to all intents and purposes the coil 10 of the reactive coil would be out of circuit. The full potential difference of the mains 2 and 3 would therefore be impressed upon that portion of the constant-current circuit including the coil 11 and such lamps of the system as happened to be in use. If there should happen to be very few lamps or none at all in circuit, it will be evident that the coil 11, which is designed to take care of approximately half of the potential difference of the mains 2 and 3, receives under these circumstances nearly the whole potential difference. An excessive current would therefore flow which might ultimately destroy the apparatus. I find that this objection may be avoided by grounding the neutral point of the alternating-current-supply system in any well-known manner, as by grounding the middle point of the generator-winding or the middle point of the primary winding of a transformer connected to the supply-mains. Thus by way of example I have represented the middle point of the primary of the transformer 4 grounded at G. Under these circumstances it is not possible for any combination of undesired grounds on the system to throw more than half of the line-voltage upon one of the coils of the constant-current reactive coil.

The action of the reactive coil when the neutral point of the supply system is grounded is interesting. When acting strictly as a reactive coil, both coils generate a counter electromotive force in opposition to that across the lines to which they are connected, and this counter electromotive force varies automatically in accordance with the number of lamps in circuit, so as to maintain the desired constant current in the lamp-circuit. As soon, however, as a ground occurs on the line one of the coils acts more or less like the primary winding of an ordinary transformer. If the ground is so located that there are no lamps in series with this coil, it acts purely as a primary and induces under all conditions sufficient voltage in the circuit to keep the current constant. This change in the action of the coil from an absorptive device to a generating device I take advantage of to operate an indicating device for making known when such a ground or grounds occur on the circuit. Such an indicating device I find very desirable, if not absolutely necessary, since the presence of a single ground on the circuit has no apparent effect on the lamps, which continue to burn until another ground occurs, the occurrence of which by causing an excess of current to flow would blow the fuses or other protective devices 16 in the supply-leads, and thereby give notification of the trouble.

To give notification of a single ground, I make use of an indicator, which may be embodied in a number of different forms, for making known the change of function of one of the reactive coils from an absorptive device to a generating device. Thus in Fig. 1 I connect a potential-transformer 17 across the terminals of the coil 11 and another potential-transformer 18 across the terminals of the other coil 10. The secondary windings of these transformers I connect in series, as indicated, and in circuit therewith I place a telltale device—such, for example, as an incandescent lamp, a semaphore, or the like—the same being indicated conventionally at 19. The secondary windings are connected in opposition to each other, so that when the system is in normal operation no considerable voltage is impressed upon the indicating device 19. Upon the occurrence of a ground such as would have the effect of causing one of the coils to act as a generating device instead of an absorptive device the voltages of the secondaries of the potential-transformers would come into conjunction with each other, thereby impressing a considerable voltage upon the indicating device 19, thus making known the presence of the ground.

Instead of making use of potential-transformers for the purpose indicated each of the coils 10 and 11 might be provided with a small indicating-winding in close inductive relation thereto, such windings being represented in Fig. 3 at 20 and 21, respectively. These latter windings are connected in opposition with each other and include in circuit an indicating device 22, which is brought into operation in substantially the same manner as the indicating device represented in Fig. 1.

In Fig. 2 is represented another indicating device which I may employ, consisting, as indicated, of a transformer provided with three coils 23, 24, and 25. One of the coils 24 is connected in series with a lead extending to the reactive coil and at a point in this lead near where it makes connection with the reactive coil. Another coil 23 is similarly connected in the other supply-lead, the connections being made so that the coils 23 and 24 magnetize in opposition to each other. The winding 25, which is a secondary winding, is therefore practically without current during normal operation of the system, but acts to energize the indicating device 26 upon the occurrence of conditions already mentioned.

What I claim as new, and desire to secure by Letters Patent of the United States, is—

1. The combination of constant-potential mains, leads extending therefrom, windings adapted to generate reactive electromotive force in series with said leads, and translating devices connected in circuit between said windings.

2. The combination of constant-potential mains, leads extending therefrom, a reactive coil having windings in series with said leads, and translating devices connected in circuit between said windings.

3. The combination of constant-potential mains, leads extending therefrom, a reactive coil in circuit with said leads, and translating devices connected between portions of the winding of said reactive coil.

4. The combination of a grounded constant-potential supply system, a series circuit supplied therefrom, translating devices in said circuit, and inductively-related windings, one of said windings in circuit with one of the leads extending to said translating devices and another of said windings in circuit with the other lead extending to said translating devices.

5. The combination of a grounded constant-potential supply system, a series circuit supplied therefrom, translating devices in said circuit, and inductively-related relatively movable windings, one of said windings in circuit with one of the leads extending to said translating devices and another of said windings in circuit with the other lead extending to said translating devices.

6. The combination of a constant-potential system grounded at a neutral point, a divided reactive coil traversed by current therefrom, and translating devices connected in circuit between the divisions of said winding.

7. The combination of constant-potential mains, a divided reactive coil traversed by current therefrom, translating devices in circuit between portions of the winding of such divided reactive coil, and an indicating device responsive to relative reversal of polarity at the terminals of the portions of said winding.

8. The combination of a divided reactive coil, means for passing current therethrough, and means for indicating when the polarity of one portion of the winding of the reactive coil reverses with respect to the other portion of the winding of the reactive coil.

In witness whereof I have hereunto set my hand this 4th day of June, 1902.

WALTER S. MOODY.

Witnesses:
BENJAMIN B. HULL,
HELEN ORFORD.